(12) United States Patent
Nitanda (10) Patent No.: US 7,738,931 B2
(45) Date of Patent: Jun. 15, 2010

(54) DEVICE AND METHOD FOR USER INTERFACE MANIPULATION ON A SLIDER TYPE PORTABLE MOBILE COMMUNICATIONS DEVICE

(75) Inventor: Hiroyuki Nitanda, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 557 days.

(21) Appl. No.: 11/742,636

(22) Filed: May 1, 2007

(65) Prior Publication Data

US 2009/0186671 A1    Jul. 23, 2009

(51) Int. Cl.
  *H04M 1/00* (2006.01)
(52) U.S. Cl. .................................. 455/575.4; 455/90.2
(58) Field of Classification Search ............... 455/575.4
   See application file for complete search history.

(56) References Cited

U.S. PATENT DOCUMENTS 7,196,316 B2 *   3/2007   Chan et al. ................. 250/221

2004/0021702 A1 *   2/2004   Lucaci et al. ............... 345/864
2005/0153661 A1 *   7/2005   Beck ........................... 455/73
2005/0208799 A1    9/2005   Oda

FOREIGN PATENT DOCUMENTS

WO           2007036595 A       4/2007
WO      WO 2007036595 A1 *      4/2007

* cited by examiner

*Primary Examiner*—Edward Urban
*Assistant Examiner*—Golam Sorowar
(74) *Attorney, Agent, or Firm*—Harrity & Harrity, LLP (57) ABSTRACT

A method and apparatus for operating the user interface of a slider type portable mobile communications device is disclosed. A mode of operation of the slider type portable mobile communications device is determined. Motion of a slider mechanism is detected with respect to a neutral position. The motion of the slider mechanism indicates an action to perform based on the mode of operation of the portable mobile communications device. The action indicated is then performed based on the mode of operation of the portable mobile communications device.

32 Claims, 6 Drawing Sheets

DEVICE AND METHOD FOR USER INTERFACE MANIPULATION ON A SLIDER TYPE PORTABLE MOBILE COMMUNICATIONS DEVICE

BACKGROUND OF THE INVENTION

Portable mobile communications devices such as mobile phones are becoming ever more sophisticated and include many new features and capabilities. One type of portable mobile communications device utilizes a slider mechanism to open or expose additional surface area on the device. The additional surface area can be used for user input as it typically includes additional buttons such as a keypad or other navigational keys.

Heretofore, the sliding mechanism itself was not considered an input or navigational mechanism.

BRIEF SUMMARY OF EMBODIMENTS OF THE INVENTION

In one embodiment there is a method and apparatus for operating the user interface of a slider type portable mobile communications device is disclosed. A mode of operation of the slider type portable mobile communications device is determined. Motion of a slider mechanism is detected with respect to a neutral position. The motion of the slider mechanism indicates an action to perform based on the mode of operation of the portable mobile communications device. The action indicated is then performed based on the mode of operation of the portable mobile communications device.

In another embodiment there is a method and apparatus for navigating the menu system of a slider type portable mobile communications device equipped with a slider motion detection application is disclosed. The slider type portable mobile communications device displays a menu on the display. The menu illustrates a plurality of selectable menu items and is capable of being navigated in at least one direction but more likely two (horizontal and vertical). The motion of a slider mechanism is detected with respect to a neutral position. The motion of the slider mechanism indicates a direction to navigate among the plurality of selectable menu items. The display is refreshed to highlight one of the adjacent plurality of selectable menu items based on the detected motion of the slider mechanism.

DETAILED DESCRIPTION OF EMBODIMENTS OF THE INVENTION

The present invention is characterized in embodiments that include a method, a computer readable medium storing a computer program product, and an apparatus for navigating the menu system of a slider type portable mobile communications device equipped with a slider motion detection mechanism.

Figure 1:
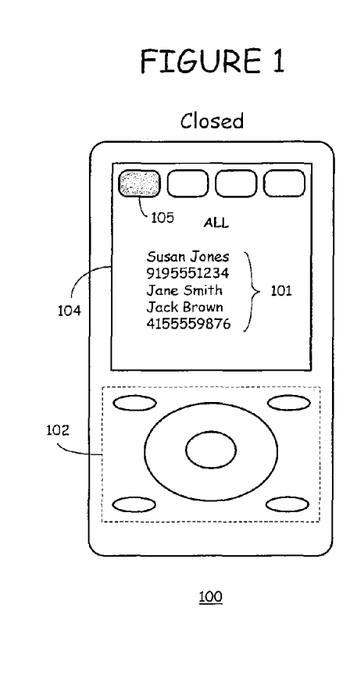
FIG. 1 is an illustration of a slider type portable mobile communications device in the closed position with its display illustrating a menu list.

FIG. 1 is an illustration of a slider type portable mobile communications device 100 in the closed position with its display illustrating a menu list 101. The closed position is typical when the portable mobile communications device 100 is not in use and also when in use for limited functions. The user can typically answer calls and navigate menu selections in the closed position using the limited number of navigational buttons 102 illustrated below the display surface 104. In addition to the menu list 101 displayed on display 104, there are four 'soft' tab keys 105 that will change the menu selection list 101 when the user horizontally navigates among the tab keys 105. Tab key 105 appears highlighted to show that it is the currently active tab key to which the illustrated menu selection list 101 is associated. A 'soft' key refers to a key that is part of the display and cannot be actuated by physical means but rather is actuated by navigating to it and actuating a physical key that is denoted as the enter key for the soft key. Soft keys enable the portable mobile communications device to implement a customizable set of functions that can be launched by the user without the need for a direct hardwired physical key for each function. Soft keys are 'programmable' using software.

The display illustrations for FIGS. 1-7 are meant to be consistent. However, only FIG. 1 has labeled the menu list 101, the soft tab keys 105, the display 104, and the navigational buttons 102 explicitly. FIGS. 2-7 also contain one or more of these items but have not been explicitly labeled to avoid unnecessary clutter in the illustrations.

Figure 2:
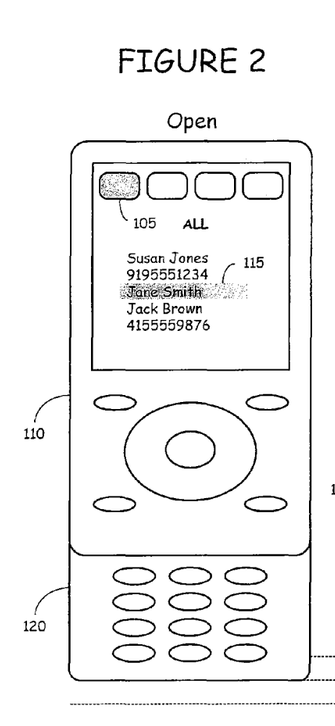
FIG. 2 is an illustration of a slider type portable mobile communications device in the open position with its display illustrating a menu list.

FIG. 2 is an illustration of a slider type portable mobile communications device 100 in the open position with its display illustrating a menu list. The open position refers to separating the top portion 110 of portable mobile communications device 100 from the bottom portion 120 of portable mobile communications device utilizing a mechanical slider mechanism that permits the separation but maintains the requisite electrical connectivity between the top 110 and bottom 120 portions. The open position for purposes of the embodiments of the present invention is considered a neutral position in that it serves as a starting and ending point with which to judge other detected slider motion. The actual physical sliding mechanism is not relevant to the embodiments of the present invention except so far as the embodiments of the present invention can detect and recognize the positions of the portable mobile communications device 100 when the slider mechanism is utilized.

In FIG. 2, the display is illustrating a menu tab/list associated with the call tracking function implemented into the portable mobile communications device. The call tracking function is but one example of many menu tab/list functions implemented on the portable mobile communications device. This function has been chosen to illustrate how the embodiments of the present invention operate when the user manipulates the slider mechanism of the portable mobile communications device.

Figure 3:
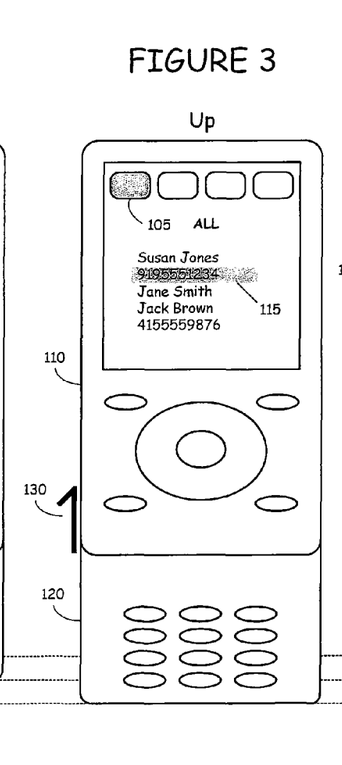
FIG. 3 is an illustration of a slider type portable mobile communications device in the up position with its display illustrating a menu list.
Figure 4:
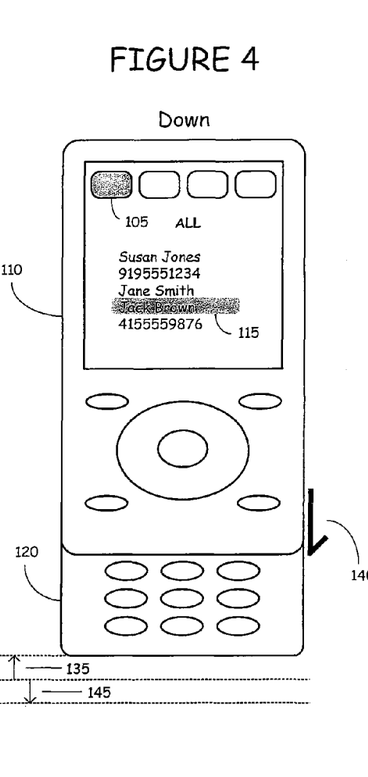
FIG. 4 is an illustration of a slider type portable mobile communications device in the down position with its display illustrating a menu list.

There are four tabs 105 illustrated for the call tracking function. The highlighted tab 105 represents all calls to and from the portable mobile communications device up to a pre-defined limit. As will be explained later, the next tab to the right of the highlighted tab represents incoming calls that were answered by the portable mobile communications device. The next tab represents outgoing calls that were placed by the portable mobile communications device. The last tab represents incoming calls that were missed (unanswered) by the portable mobile communications device. The menu list itself identifies the called or calling party that the call was placed to or came from. In this example, 'Jane Smith' has been highlighted 115 to indicate that the user has currently navigated the list to this particular entry. This has been done to illustrate the change that will occur to the menu list in subsequent FIGS. (3 & 4) based on detected slider motion.

FIGS. 3-4 illustrate vertical (up/down) motion detection of the slider mechanism and its effects on the display.

FIG. 3 is an illustration of a slider type portable mobile communications device 100 in the up position 130 with its display illustrating a menu list. This Figure represents what happens to the display when the user slightly extends the slider mechanism past the open position briefly 135 before it returns to the neutral open position of FIG. 2. The motion is consistent with that of the user using his thumb to shift the top portion 110 up a short distance 135 and back down to indicate to the portable mobile communications device 100 a desire to move the highlight on the list up one item. This is shown in FIG. 3 as highlight 115 is now over '9195551234' which is the item one above 'Jane Smith'.

FIG. 4 is an illustration of a slider type portable mobile communications device 100 in the down position 140 with its display illustrating a menu list. This Figure represents what happens to the display when the user slightly retracts the slider mechanism toward the closed position briefly 135 before it returns to the neutral open position of FIG. 2. The motion is consistent with that of the user using his thumb to shift the top portion 110 down a short distance 135 and back down to indicate to the portable mobile communications device 100 a desire to move the highlight on the list down one item. This is shown in FIG. 4 (relative to FIG. 2) as highlight 115 is now over 'Jack Brown' which is the item one below 'Jane Smith'.

Figure 5:
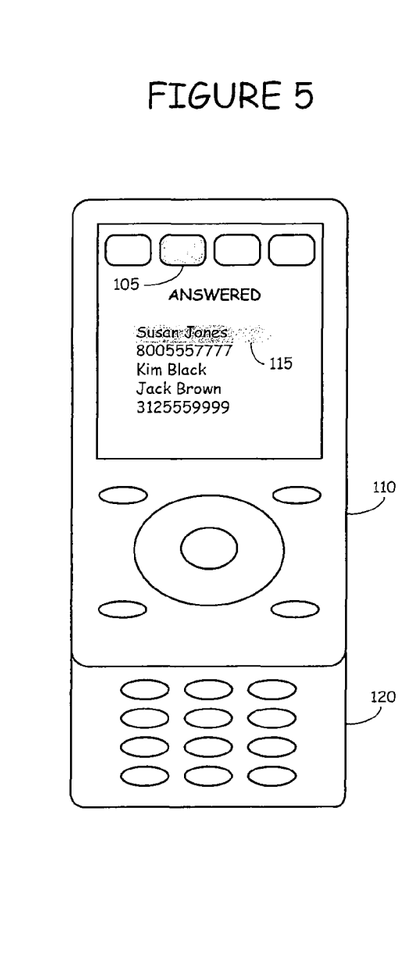
FIG. 5 is another illustration of a slider type portable mobile communications device in the open position with its display illustrating a menu list.
Figure 6:
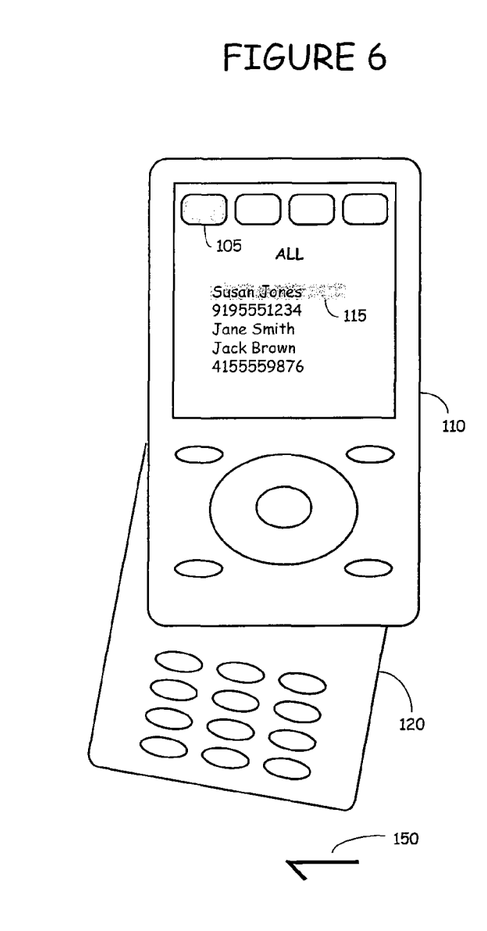
FIG. 6 is an illustration of a slider type portable mobile communications device in the open position tilted to the left with its display illustrating a menu list.
Figure 7:
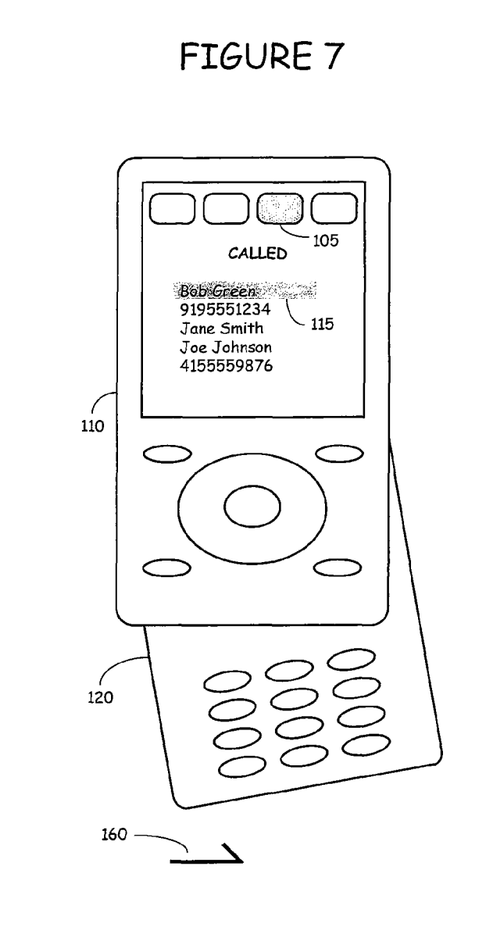
FIG. 7 is an illustration of a slider type portable mobile communications device in the open position tilted to the right with its display illustrating a menu list.

FIG. 5 is another illustration of a slider type portable mobile communications device 100 in the open position with its display illustrating a menu list. FIG. 5 is similar to FIG. 2 in that the slider type portable mobile communications device 100 is shown in the open or neutral position. This time the tab second from the left 105 is highlighted because FIGS. 5-7 are used to describe horizontal navigation using the slider mechanism. FIGS. 2-4 were used to describe vertical navigation using the slider mechanism. The call tracking function is still the illustrative example. Thus, the second highlighted tab 105 presents a menu list of answered calls. Further, the highlighted entry 115 is the top entry labeled 'Susan Jones'.

FIGS. 6-7 illustrate horizontal (left/right) motion detection of the slider mechanism and its effects on the display.

Figure 6A:
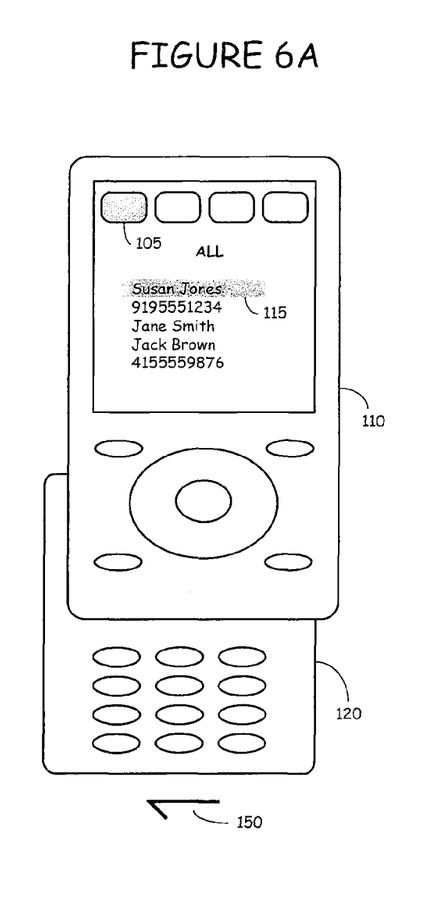
FIG. 6a is another illustration of a slider type portable mobile communications device in the open position tilted to the left with its display illustrating a menu list.

FIGS. 6 and 6a are illustrations of a slider type portable mobile communications device 100 in the open position tilted to the left 150 with its display illustrating a menu list. These Figures represent what happens to the display when the user slightly shifts the slider mechanism to the left briefly 150 before it returns to the neutral open position of FIG. 5. The motion is consistent with that of the user using his thumb to shift the top 110 (or bottom 120) portion left a short distance 150 and back to indicate to the portable mobile communications device 100 a desire to move the highlight on the tabs left one space. This is shown in FIGS. 6 and 6a (relative to FIG. 5) as highlight 105 is now over 'ALL' which is the item one to the left of 'ANSWERED'.

Figure 7A:
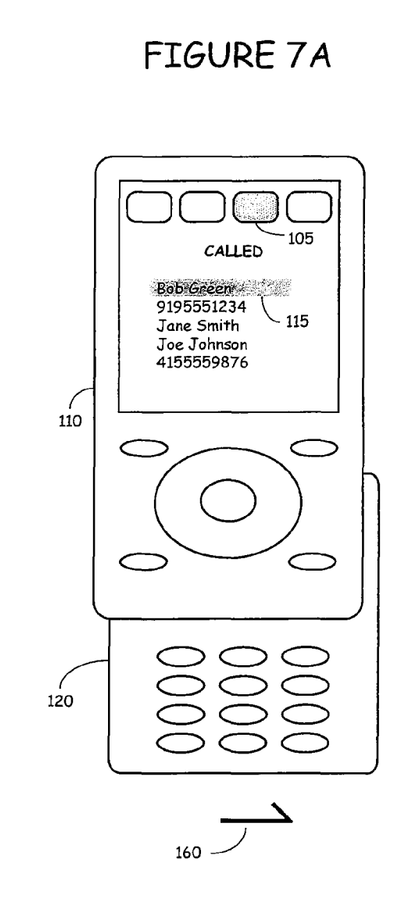
FIG. 7a is another illustration of a slider type portable mobile communications device in the open position tilted to the right with its display illustrating a menu list.

FIGS. 7 and 7a are illustrations of a slider type portable mobile communications device 100 in the open position tilted to the right 160 with its display illustrating a menu list. These Figures represent what happens to the display when the user slightly shifts the slider mechanism to the right briefly 160 before it returns to the neutral open position of FIG. 5. The motion is consistent with that of the user using his thumb to shift the top 110 (or bottom 120) portion right a short distance 160 and back to indicate to the portable mobile communications device 100 a desire to move the highlight on the tabs right one space. This is shown in FIGS. 7 and 7a (relative to FIG. 5) as highlight 105 is now over 'CALLED' which is the item one to the right of 'ANSWERED'.

FIGS. 2-7 have been described using a brief up/back, down/back, left/back, and right/back motion of the top 110 and/or bottom 120 portions of the portable mobile communications device to indicate a increment of one item up, down, left, or right on the display. The user may also hold the up, down, left, or right position for longer periods to indicate a scrolling type action that will continue to increment or decrement the tab/list of the display in the desired direction until the slider mechanism is released and returned to the neutral open position illustrated in FIGS. 2 and 5. Moreover, the display can be made to 'wrap' around the end of a list or set of tabs such that, for instance, moving down one space from the bottom item of a list will return the highlighted (selectable) entry to the top of the list. The same applies for up, left, and right detected slider motion as it will wrap to the beginning as if the list or set of tabs were an infinite pattern.

In addition, it is not relevant to the embodiments of the present invention whether the top portion 110 is moved relative to the bottom portion 120 or vice versa. Either implementation or both can be detected and acted upon.

Figure 8:
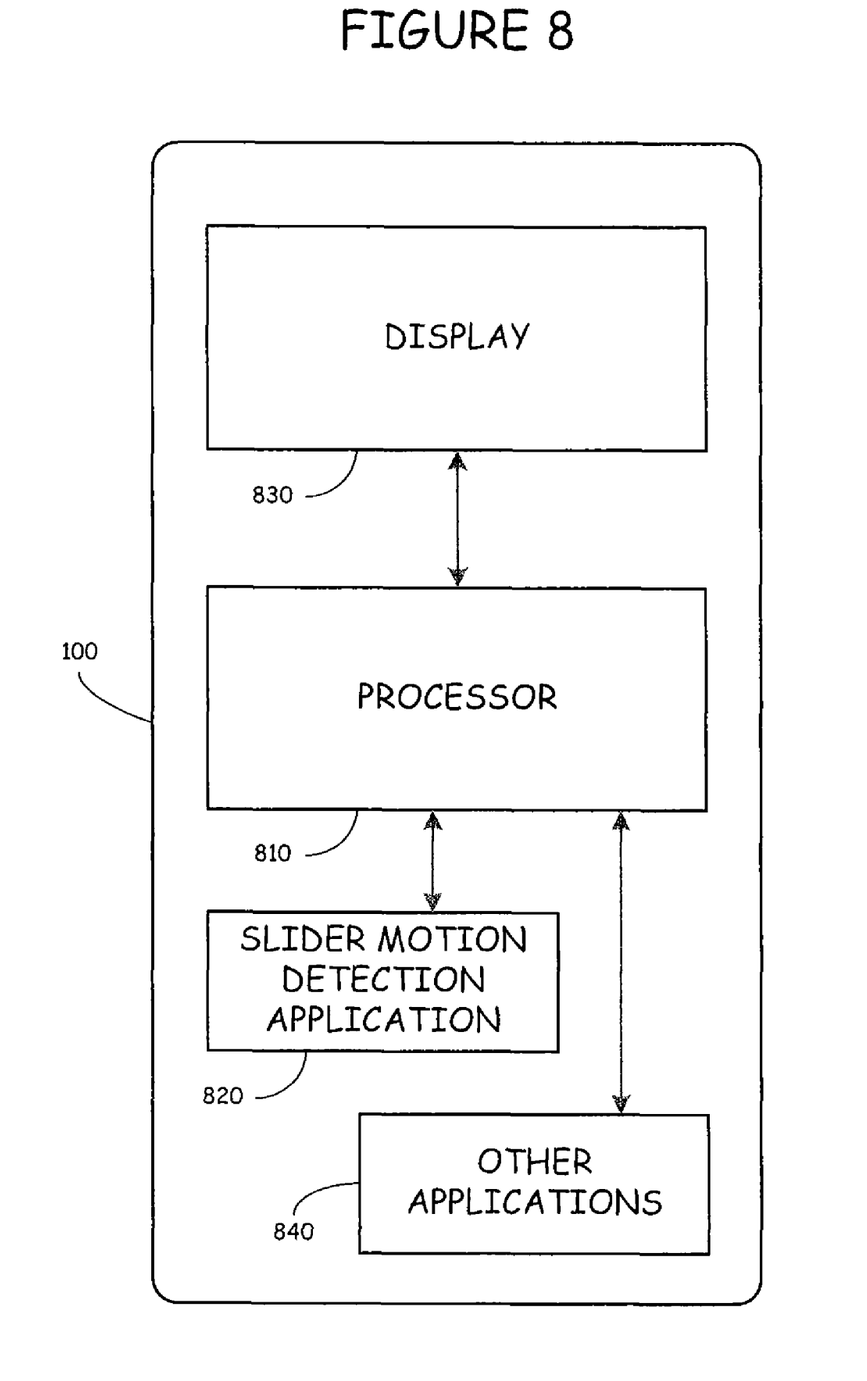
FIG. 8 is a block diagram of some of the components that comprise the slider type portable mobile communications device characterized in the embodiments of the present invention.

FIG. 8 is a block diagram of some of the components that comprise the slider type portable mobile communications device 100 characterized in the embodiments of the present invention. A processor 810 is used to receive input from and execute a slider motion detection application 820. The slider motion detection application detects when the slider type portable mobile communications device 100 is in the open position. From the open position, slider motion detection can be interpreted into navigational commands that will affect what is being displayed on the display 830. For instance, nudging the top portion up and back relative to the bottom portion indicates that the user wishes to navigate the menu system up one selectable item on the display. Similarly, nudging the top portion down and back relative to the bottom portion indicates that the user wishes to navigate the menu system down one selectable item on the display. The same goes for horizontal displacement between the top and bottom portions of the slider type portable mobile communications device 100.

The open or neutral position is set to be just shorter than the full extension possible of the slider mechanism leaving the possibility of further extension that can be detected and interpreted into navigational commands. For horizontal motion detection, the slider mechanism is equipped to allow for slight displacement of the top portion with respect to the bottom portion to the left and right. The actual motion of the top portion with respect to the bottom portion (or vice versa) need not be exactly to the left or right as in FIGS. 6a and 7a but could be based on a pivoting motion in which the user initiates a displacement in the desired direction. The actual motion can be 'arc' like as in FIGS. 6 and 7 based on a pivot but since the actual displacement will be small the perception of the motion will be a horizontal vector. It is similar to turning the steering wheel of an automobile.

Other applications 840 refers to a variety of software or system functions that have navigable menu selections that could benefit from the slider motion detection application. The call tracking function is but one example of such an application 840 that contains navigable menu selections.

Figure 9:
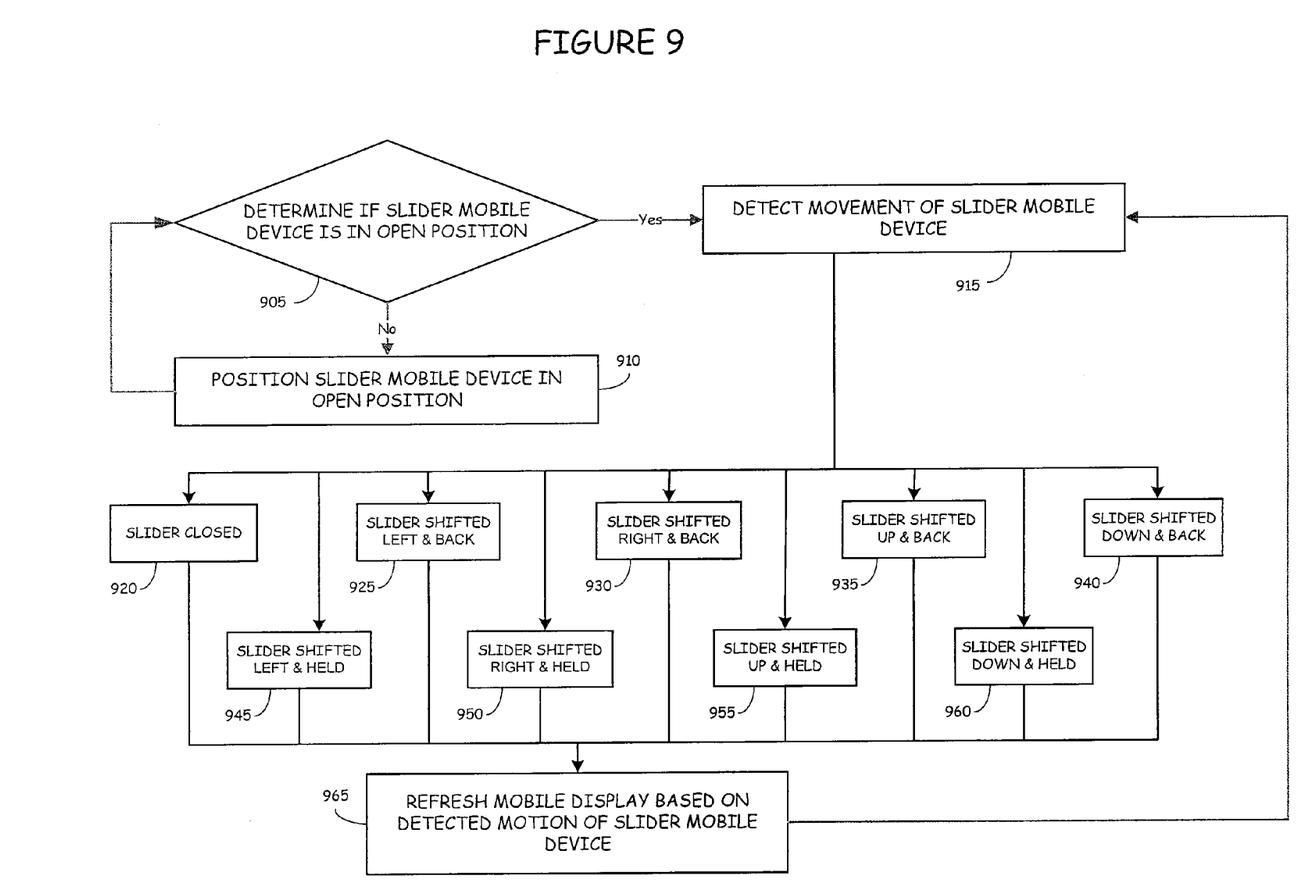
FIG. 9 is a flowchart describing the functions associated with motion detection of the slider type portable mobile communications device and its effects on the display.

FIG. 9 is a flowchart describing the functions associated with motion detection of the slider type portable mobile communications device and its effects on what is being displayed on the display. The slider motion detection application determines whether the slider type portable mobile communications device is in the open position 905. If not, the slider motion detection application will wait 910 until the slider type portable mobile communications device is in the open position. Once in the open position, the slider motion detection application will detect and interpret motion of the slider mechanism 915. There are nine types of motion that can be detected.

One type of motion that can be detected is that of returning the slider type portable mobile communications device to the closed position 920. This will result in the mobile display being refreshed 965 based on this action. Returning the portable mobile communications device to the closed position can either have no effect on the display or can cause the display to return to its top level or default from whatever it was currently displaying acting as a sort of global 'back' key.

Another type of motion that can be detected is that of shifting the slider type portable mobile communications device to the left and back 925. This will result in the mobile display being refreshed 965 to indicate that the user wishes to horizontally navigate one menu/tab item to the left for whatever is currently being displayed.

Another type of motion that can be detected is that of shifting the slider type portable mobile communications device to the left and holding 945. This will result in the mobile display being refreshed 965 to indicate that the user wishes to horizontally scroll the menu/tab items to the left for whatever is currently being displayed until the user returns the slider mechanism to the open position.

Another type of motion that can be detected is that of shifting the slider type portable mobile communications device to the right and back 930. This will result in the mobile display being refreshed 965 to indicate that the user wishes to horizontally navigate one menu/tab item to the right for whatever is currently being displayed.

Another type of motion that can be detected is that of shifting the slider type portable mobile communications device to the right and holding 950. This will result in the mobile display being refreshed 965 to indicate that the user wishes to horizontally scroll the menu/tab items to the right for whatever is currently being displayed until the user returns the slider mechanism to the open position.

Another type of motion that can be detected is that of shifting the slider type portable mobile communications device up and back 935. This will result in the mobile display being refreshed 965 to indicate that the user wishes to vertically navigate one menu/tab item up for whatever is currently being displayed.

Another type of motion that can be detected is that of shifting the slider type portable mobile communications device up and holding 955. This will result in the mobile display being refreshed 965 to indicate that the user wishes to vertically scroll the menu/tab items up for whatever is currently being displayed until the user returns the slider mechanism to the open position.

Another type of motion that can be detected is that of shifting the slider type portable mobile communications device down and back 940. This will result in the mobile display being refreshed 965 to indicate that the user wishes to vertically navigate one menu/tab item down for whatever is currently being displayed.

Another type of motion that can be detected is that of shifting the slider type portable mobile communications device down and holding 960. This will result in the mobile display being refreshed 965 to indicate that the user wishes to vertically scroll the menu/tab items down for whatever is currently being displayed until the user returns the slider mechanism to the open position.

Other applications 840 can also refer to a variety of software or system functions that do not necessarily have navigable menu selections but are actuated or controlled via other user interface actions that could benefit from the slider motion detection application. Such applications could include, for instance, a music playing application, a digital camera application, or a push-to-talk (PTT) application. In these applications user interface actions can control various features.

For a digital camera application, slider motion in a particular direction can indicate taking a picture, zooming in or zooming out, re-focusing, setting a flash, etc. As an example, the user could be in the digital camera mode with the slider mechanism in the open position which is also the neutral position. Extending and holding the slider top and bottom portions away from one another with respect to the neutral position (as illustrated in FIG. 3) could cause the display to zoom out until released back to the neutral position. Similarly, compressing the top and bottom portions toward one another (as illustrated in FIG. 4) could cause the display to zoom in until released back to the neutral position. Other slider movements can be programmed to perform other camera functions such as, but not limited to, taking a picture or focusing the camera. One of ordinary skill in the art could readily extend this idea to digital video camera operation as well.

For a music player application, slider motion in a particular direction can indicate selecting a song, controlling the volume, pausing the playback, changing a playlist, etc. As an example, the user could be in the music player mode with the slider mechanism in the open position which is also the neutral position. Extending and holding the slider top and bottom portions away from one another with respect to the neutral position (as illustrated in FIG. 3) could cause the volume to increase until released back to the neutral position. Similarly, compressing the top and bottom portions toward one another (as illustrated in FIG. 4) could cause the volume to decrease until released back to the neutral position. Other slider movements can be programmed to perform other music player functions such as, but not limited to, changing songs, changing playlists, or pausing playback.

Figure 10:
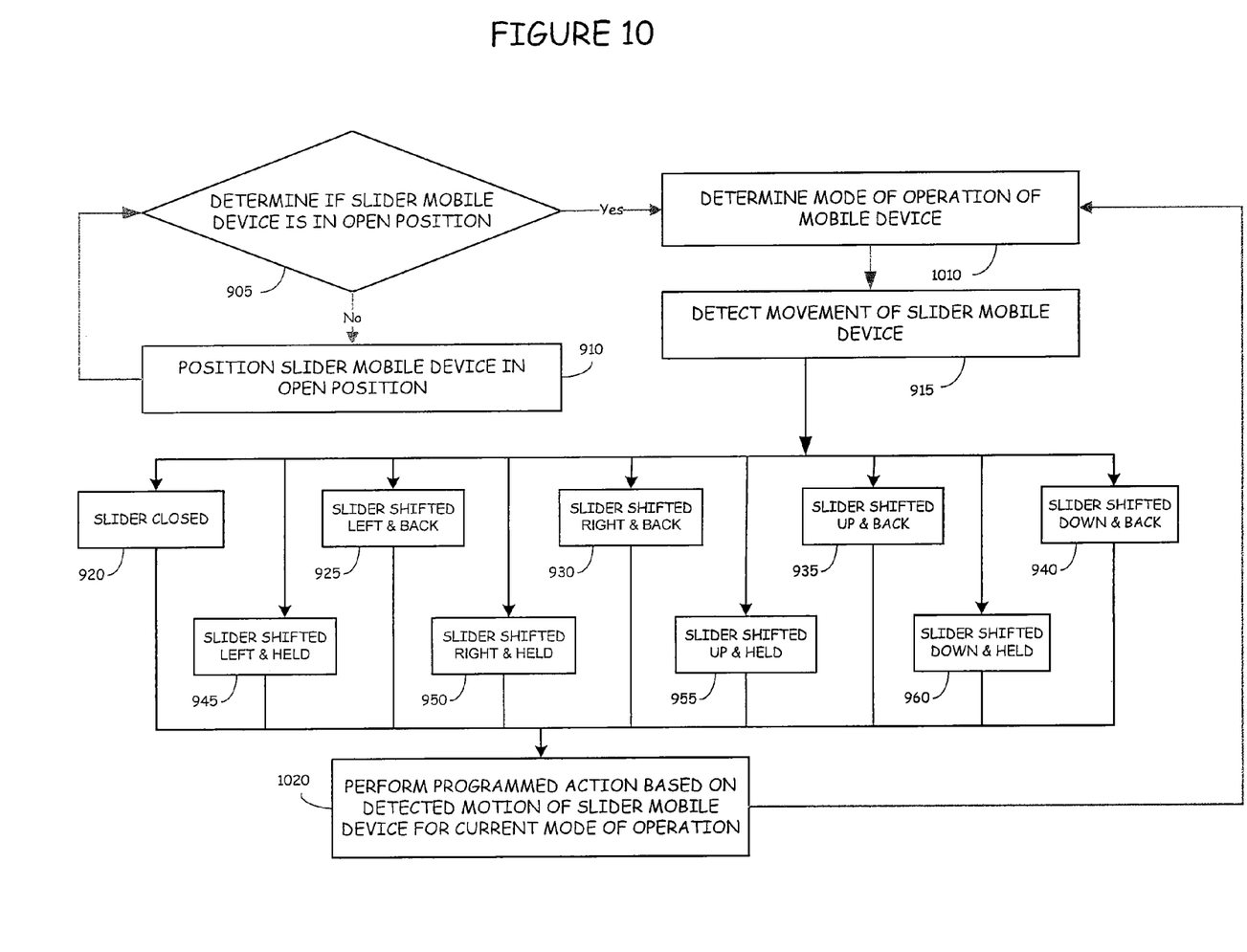
FIG. 10 is a flowchart describing the functions associated with motion detection of the slider type portable mobile communications device and its effects on the current mode of operation of the portable mobile communications device.

FIG. 10 is a flowchart describing the functions associated with motion detection of the slider type portable mobile communications device and its effects on the current mode of operation of the mobile device. The slider motion detection application determines whether the slider type portable mobile communications device is in the open position 905. If not, the slider motion detection application will wait 910 until the slider type portable mobile communications device is in the open position. The portable mobile communications device then determines the current mode of operation 1010. The current mode of operation can refer to a particular application or a mode such as a digital still/video camera mode, a music player mode, a push-to-talk (PTT) mode, etc. Other modes of operation can be incorporated by one of ordinary skill in the art without straying from the scope of the present application.

Once in the open position, the slider motion detection application will detect and interpret motion of the slider mechanism 915. There are nine types of motion that can be detected.

One type of motion that can be detected is that of returning the slider type portable mobile communications device to the closed position 920. Returning the portable mobile communications device to the closed position can either have no effect on the current mode/application or can cause the portable mobile communications device to return to its default mode/application from whatever it was currently displaying acting as a sort of global 'back' key.

Another type of motion that can be detected is that of shifting the slider type portable mobile communications device to the left and back 925. This will cause the portable mobile communications device to take a pre-programmed action 1020 associated with a left/back shift of the slider mechanism based on the current mode of operation.

Another type of motion that can be detected is that of shifting the slider type portable mobile communications device to the left and holding 945. This will cause the portable mobile communications device to take a pre-programmed action 1020 associated with a left/hold shift of the slider mechanism based on the current mode of operation until the user returns the slider mechanism to the open position.

Another type of motion that can be detected is that of shifting the slider type portable mobile communications device to the right and back 930. This will cause the portable mobile communications device to take a pre-programmed action 1020 associated with a right/back shift of the slider mechanism based on the current mode of operation.

Another type of motion that can be detected is that of shifting the slider type portable mobile communications device to the right and holding 950. This will cause the portable mobile communications device to take a pre-programmed action 1020 associated with a right/hold shift of the slider mechanism based on the current mode of operation until the user returns the slider mechanism to the open position.

Another type of motion that can be detected is that of shifting the slider type portable mobile communications device up and back 935. This will cause the portable mobile communications device to take a pre-programmed action 1020 associated with a up/back shift of the slider mechanism based on the current mode of operation.

Another type of motion that can be detected is that of shifting the slider type portable mobile communications device up and holding 955. This will cause the portable mobile communications device to take a pre-programmed action 1020 associated with a up/hold shift of the slider mechanism based on the current mode of operation until the user returns the slider mechanism to the open position.

Another type of motion that can be detected is that of shifting the slider type portable mobile communications device down and back 940. This will cause the portable mobile communications device to take a pre-programmed action 1020 associated with a down/back shift of the slider mechanism based on the current mode of operation.

Another type of motion that can be detected is that of shifting the slider type portable mobile communications device down and holding 960. This will cause the portable mobile communications device to take a pre-programmed action 1020 associated with a down/hold shift of the slider mechanism based on the current mode of operation until the user returns the slider mechanism to the open position.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any prompts associated with the present invention may be presented and responded to via a graphical user interface (GUI) presented on the display of the portable mobile communications device or the like.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A method of operating mobile communications device, the method comprising:

detecting, by the mobile communications device, that a user uses a slider mechanism, in the mobile communications device, to open the mobile communications device;

determining, by the mobile communications device, a mode of operation associated with the mobile communications device;

detecting, by the mobile communications device and after the user opens the mobile communications device, a direction of a motion of the slider mechanism, with respect to a neutral position, and a duration of the motion, where the direction of the motion of the slider mechanism, the duration of the motion, and the mode of operation indicate an action to perform, where the action includes at least one of a first action, a second action, a third action, a fourth action, a fifth action, a sixth action, a seventh action, or an eighth action that differ, and where:

the motion of the slider mechanism toward left, for more than a particular period of time, is associated with the first action, the motion of the slider mechanism toward left, for less than the particular period of time, is associated with the second action, the motion of the slider mechanism toward right, for less than the particular period of time, is associated with the third action, the motion of the slider mechanism toward right, for more than the particular period of time, is associated with the fourth action, the motion of the slider mechanism toward up, for more than the particular period of time, is associated with the fifth action, the motion of the slider mechanism toward up, for less than the particular period of time, is associated with the sixth action, the motion of the slider mechanism toward down, for less than the particular period of time, is associated with the seventh action, and the motion of the slider mechanism toward down, for more than the particular period of time, is associated with the eighth action; and performing, by the mobile communications device, the action.

2. The method of claim 1, where the mode of operation includes at least one of:

a digital camera mode of operation, a music player mode of operation, or a push-to-talk (PIT) mode of operation.

3. The method of claim 1, the method further comprising:
displaying a menu on a display of the mobile communications device, where the menu illustrates a plurality of selectable menu items and is navigated via the slider mechanism,
where the action corresponds to navigating the plurality of selectable menu items; and
refreshing the display to highlight one of the plurality of selectable menu items based on the action.

4. The method of claim 3, where refreshing the display to highlight one of the plurality of selectable menu items includes the sixth action, and where the sixth action includes causing the display to refresh and highlight one of the plurality of selectable menu items that is displayed one above a previously highlighted selectable menu item.

5. The method of claim 3, where refreshing the display to highlight one of the plurality of selectable menu items includes the fifth action, and where the fifth action includes causing the display to refresh and scroll over one or more of the plurality of selectable menu items that are displayed above a previously highlighted selectable menu item, where the fifth action continues until the slider mechanism is returned, by the user, to the neutral position.

6. The method of claim 3, where refreshing the display to highlight one of the plurality of selectable menu items includes the seventh action, and where the seventh action includes causing the display to refresh and highlight one of the plurality of selectable menu items that is displayed one below a previously highlighted selectable menu item.

7. The method of claim 3, where refreshing the display to highlight one of the plurality of selectable menu items includes the eighth action, and where the eighth action includes causing the display to refresh and scroll over one or more of the plurality of selectable menu items that are displayed below a previously highlighted selectable menu item, where the eighth action continues until the slider mechanism is returned, by the user, to the neutral position.

8. The method of claim 3, where refreshing the display to highlight one of the plurality of selectable menu items includes the second action, and where the second action includes causing the display to refresh and highlight one of the plurality of selectable menu items that is displayed one to the left of a previously highlighted selectable menu item.

9. The method of claim 3, where refreshing the display to highlight one of the plurality of selectable menu items includes the first action, and where the first action includes causing the display to refresh and scroll over one or more of the plurality of selectable menu items that are displayed to the left of a previously highlighted selectable menu item, where the first action continues until the slider mechanism is returned, by the user, to the neutral position.

10. The method of claim 3, where refreshing the display to highlight one of the plurality of selectable menu items includes the third action, and where the third action includes causing the display to refresh and highlight one of the plurality of selectable menu items that is displayed one to the right of a previously highlighted selectable menu item.

11. The method of claim 3, where refreshing the display to highlight one of the plurality of selectable menu items includes the fourth action, and where the fourth action includes causing the display to refresh and scroll over one or more of the plurality of selectable menu items that are displayed to the right of a previously highlighted selectable menu item, where the fourth action continues until the slider mechanism is returned, by the user, to the neutral position.

12. The method of claim 3, where refreshing the display to highlight one of the plurality of selectable menu items includes one of the seventh action or the eighth action, and where refreshing the display includes causing, the display to wrap to a top of displayed ones of the plurality of selectable menu items when a current displayed position is at a bottom of the displayed ones of the plurality of selectable menu items.

13. The method of claim 3, where refreshing the display to highlight one of the plurality of selectable menu items includes one of the fifth action or the sixth action, and where refreshing the display includes causing the display to wrap to a bottom of displayed ones of the plurality of selectable menu items when a current displayed position is at a top of the displayed ones of the plurality of selectable menu items.

14. The method of claim 3, where refreshing the display to highlight one of the plurality of selectable menu items includes one of the first action or the second action, and where refreshing the display includes causing display to wrap to a right of displayed ones of the plurality of selectable menu items when a current displayed position is at a left of the displayed ones of the plurality of selectable menu items.

15. The method of claim 3, where refreshing the display to highlight one of the plurality of selectable menu items includes one of the third action or the fourth action, and where refreshing the display includes causing the display to wrap to a left of displayed ones of the plurality of selectable menu items when a displayed current position is at a right of the displayed ones of the plurality of selectable menu items.

16. A mobile communications device comprising:
a slider mechanism to:
  be moved, by a user, to open the mobile communications device, and
  when the mobile communications device is open, be further moved toward left, right, up, or down, by the user and with respect to a neutral position; and
a processor to:
  detect, when the mobile communications device is open, a direction of a motion of the slider mechanism with respect to the neutral position and a duration of the motion, the direction of the motion of the slider mechanism and the duration of the motion indicating an action to be performed, based on a mode of operation of the mobile communications device, where the action includes at least one of a first action, a second action, a third action, a fourth action, a fifth action, a sixth action, a seventh action, or an eighth action that differ, and where:
    the motion of the slider mechanism toward left, for more than a particular period of time, is associated with the first action,
    the motion of the slider mechanism toward left, for less than the particular period of time, is associated with the second action,
    the motion of the slider mechanism toward right, for less than the particular period of time, is associated with the third action,
    the motion of the slider mechanism toward right, for more than the particular period of time, is associated with the fourth action,
    the motion of the slider mechanism toward up, for more than the particular period of time, is associated with the fifth action,
    the motion of the slider mechanism toward up, for less than the particular period of time, is associated with the sixth action,
    the motion of the slider mechanism toward down, for less than the particular period of time, is associated with the seventh action, and the motion of the slider mechanism toward down, for more than the particular period of time, is associated with the eighth action, and cause the action to be performed.

17. The mobile communications device of claim 16, where the mode of operation includes at least one of:
   a digital camera mode of operation,
   a music player mode of operation, or
   a push-to-talk (PIT) mode of operation.

18. The mobile communications device of claim 16, further comprising:
   a display to display a menu system, where the menu system is to:
      illustrate a plurality of selectable menu items, and
      is navigated via the slider mechanism,
   where the action is associated with navigating the plurality of selectable menu items, and
   where the display is refreshed to highlight one of the plurality of selectable menu items based on the action.

19. The mobile communications device of claim 18, where refreshing the display to highlight one of the plurality of selectable menu items includes the sixth action, and where the sixth action includes causing the display to refresh and highlight one of the plurality of selectable menu items that is displayed one above a previously highlighted selectable menu item.

20. The mobile communications device of claim 18, where refreshing the display to highlight one of the plurality of selectable menu items includes the fifth action, and where the fifth action includes causing the display to refresh and scroll over one or more of the plurality of selectable menu items that are displayed above a previously highlighted selectable menu item, where the fifth action continues until the slider mechanism is returned, by the user, to the neutral position.

21. The mobile communications device claim 18, where refreshing the display to highlight one of the plurality of selectable menu items includes the seventh action, and where the seventh action includes causing the display to refresh and highlight one of the plurality of selectable menu items that is displayed one below a previously highlighted selectable menu item.

22. The mobile communications device of claim 18, where refreshing the display to highlight one of the plurality of selectable menu items includes the eighth action, and where the eighth action includes causing the display to refresh and scroll over one or more of the plurality of selectable menu items that are displayed below a previously highlighted selectable menu item, where the eighth action continues until the slider mechanism is returned, by the user, to the neutral position.

23. The mobile communications device of claim 18, where refreshing the display to highlight one of the plurality of selectable menu items includes the second action, and where the second action includes causing the display to refresh and highlight one of the plurality of selectable menu items that is displayed one to the left of a previously highlighted selectable menu item.

24. The mobile communications device of claim 18, where refreshing the display to highlight one of the plurality of selectable menu items includes the first action, and where the first action includes causing the display to refresh and scroll over one or more of the plurality of selectable menu items that are displayed to the left of a previously highlighted selectable menu item, where the first action continues until the slider mechanism is returned, by the user, to the neutral position.

25. The mobile communications device of claim 18, where refreshing the display to highlight one of the plurality of selectable menu items includes the third action, and where the third action includes causing the display to refresh and highlight one of the plurality of selectable menu items that is displayed one to the right of a previously highlighted selectable menu item.

26. The mobile communications device of claim 18, where refreshing the display to highlight one of the plurality of selectable menu items includes the fourth action, and where the fourth action includes causing the display to refresh and scroll over one or more of the plurality of selectable menu items that are displayed to the right of a previously highlighted selectable menu item, where the fourth action continues until the slider mechanism is returned, by the user, to the neutral position.

27. The mobile communications device of claim 18, where refreshing the display to highlight one of the plurality of selectable menu items includes one of the seventh action or the eighth action, and where refreshing the display includes causing, the display to wrap to a top of displayed ones of the plurality of selectable menu items when a current displayed position is at a bottom of the displayed ones of the plurality of selectable menu items.

28. The mobile communications device of claim 18, where refreshing the display to highlight one of the plurality of selectable menu items includes one of the fifth action or the sixth action, and where refreshing the display includes causing the display to wrap to a bottom of displayed ones of the plurality of selectable menu items when a current displayed position is at a top of the displayed ones of the plurality of selectable menu items.

29. The mobile communications device of claim 18, where refreshing the display to highlight one of the plurality of selectable menu items includes one of the first action or the second action, and where refreshing the display includes causing the display to wrap to a right of displayed ones of the plurality of selectable menu items when a current displayed position is at a left of the displayed ones of the plurality of selectable menu items.

30. The mobile communications device of claim 18, where refreshing the display to highlight one of the plurality of selectable menu items includes one of the third action or the fourth action, and where refreshing the display includes causing the display to wrap to a left of displayed ones of the plurality of selectable menu items when a displayed current position is at a right of the displayed ones of the plurality of selectable menu items.

31. A storage device for storing instructions, where the instructions, when executed in a slider type mobile communications device, cause the mobile communications device to perform a method including:
   detecting, by the mobile communications device, that a user uses a slider mechanism, in the mobile communications device, to open the mobile communications device;
   determining, by the mobile communications device, a mode of operation associated with the mobile communications device;
   detecting, by the mobile communications device and after the user opens the mobile communications device, a direction of a motion of the slider mechanism, with respect to a neutral position, and a duration of the motion, where the direction of the motion of the slider mechanism, the duration of the motion, and the mode of operation indicate an action to perform, where the action includes at least one of a first action, a second action, a third action, a fourth action, a fifth action, a sixth action, a seventh action, or an eighth action that differ, and where:
the motion of the slider mechanism toward left, for more than a particular period of time, is associated with the first action,
the motion of the slider mechanism toward left, for less than the particular period of time, is associated with the second action,
the motion of the slider mechanism toward right, for less than the particular period of time, is associated with the third action,
the motion of the slider mechanism toward right, for more than the particular period of time, is associated with the fourth action,
the motion of the slider mechanism toward up, for more than the particular period of time, is associated with the fifth action,
the motion of the slider mechanism toward up, for less than the particular period of time, is associated with the sixth action,
the motion of the slider mechanism toward down, for less than the particular period of time, is associated with the seventh action, and
the motion of the slider mechanism toward down, for more than the particular period of time, is associated with the eighth action; and
performing, by the mobile communications device, the action.

32. The storage device of claim 31, where the method performed by the mobile communications device, when executing the instructions, further comprises:
displaying a menu on a display of the mobile communications device, where the menu illustrates a plurality of selectable menu items and is navigated via the slider mechanism, where the action corresponds to navigating the plurality of selectable menu items; and
refreshing the display to highlight one of the plurality of selectable menu items based on the action.

* * * * *

UNITED STATES PATENT AND TRADEMARK OFFICE
CERTIFICATE OF CORRECTION

| | |
|---|---|
| PATENT NO. | : 7,738,931 B2 |
| APPLICATION NO. | : 11/742636 |
| DATED | : June 15, 2010 |
| INVENTOR(S) | : Hiroyuki Nitanda |

Page 1 of 1

It is certified that error appears in the above-identified patent and that said Letters Patent is hereby corrected as shown below:

Claim 14, column 12, line 17, insert the word --the-- between the words "causing" and the second occurrence of "display"

Signed and Sealed this

Third Day of August, 2010

David J. Kappos
*Director of the United States Patent and Trademark Office*